United States Patent Office 2,732,284
Patented Jan. 24, 1956

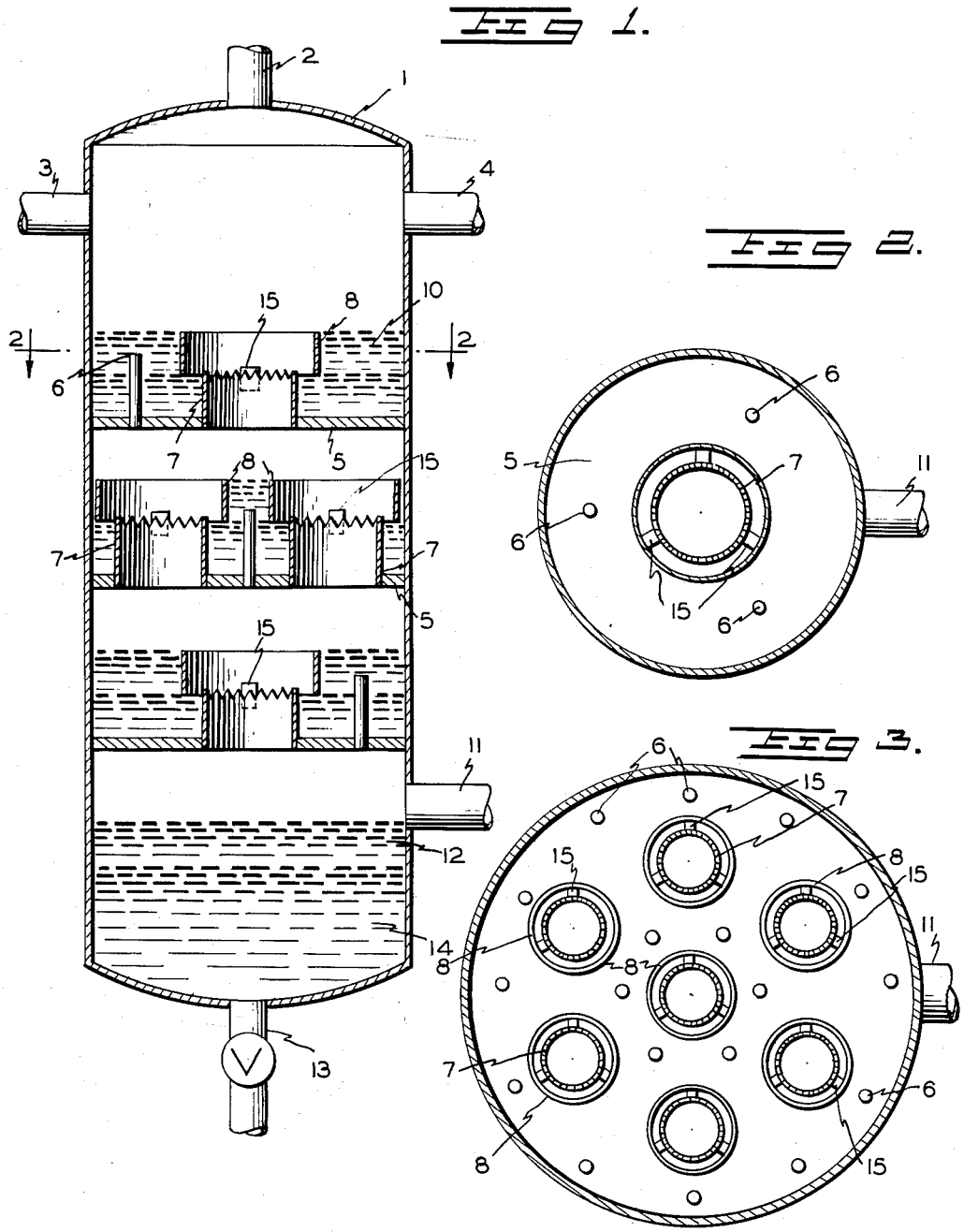

2,732,284

PROCESS AND APPARATUS FOR THE CATALYTIC DECOMPOSITION OF ALKALI METAL AMALGAMS

Walter J. Sakowski, Youngstown, N. Y., assignor to Olin Mathieson Chemical Corporation, a corporation of Virginia Application June 29, 1954, Serial No. 440,111

3 Claims. (Cl. 23—184)

My invention relates to a process and apparatus for decomposing dilute amalgams with aqueous or alcoholic decomposing fluids in the presence of a catalyst. More particularly my invention relates to a process and apparatus for the above purpose which provides for contacting a dilute alkali amalgam and a decomposing fluid flowing concurrently downward through a vertical decomposing zone while maintaining a plurality of horizontal amalgam-decomposing fluid interfaces in the decomposing zone in contact with a carbon catalyst.

For many years it has been a common practice to decompose dilute alkali metal amalgams formed in mercury cathode electrolytic cells in order to recover mercury for re-use in the cells. A valuable by-product, aqueous caustic soda, is obtained when water is used as the decomposing fluid. This process has, therefore, long been used as a source of concentrated solutions of caustic soda. Many amalgam-decomposing fluids have been employed including water, dilute aqueous caustic, lower aliphatic alcohols, and alcoholic solutions of alkali metal alcoholates. In general, any fluid which will react with an alkali metal can be used to decompose an alkali metal amalgam. The choice of decomposing fluid is usually made with a view to the value of the alkaline product formed in the reaction.

In general, innovations in the basic process have been made to provide more efficient contact between amalgam, decomposing fluid, and catalyst, and to conserve and utilize heat generated in the process. Many types of apparatus and processes have been devised which may be classified on the basis of whether flow of amalgam is horizontal or vertical.

Horizontal flow processes have been used on a large scale but have many inherent disadvantages. Amalgam is commonly allowed to flow along a substantially horizontal trough while water is flowed over the amalgam in a countercurrent direction. This method requires considerable floor space and conservation of heat generated in the reaction is difficult. A recent modification of the horizontal method is disclosed in U. S. Patent No. 2,610,908, issued September 16, 1952, to Deprez et al. The process of Deprez employs both concurrent and countercurrent flow of decomposing liquid.

The vertical flow methods of the prior art of current practical importance employ towers packed with coarse graphite which are usually operated in a completely flooded condition. The tortuous passages of these packed columns tend to restrict the escape of hydrogen generated by the process, thus effecting vigorous agitation of the liquids. Agitation of the liquids in the tower is highly undesirable since it causes mixing and dilution of concentrated caustic from one section of the tower with dilute caustic from another section. This prohibits production of caustic of greater than about 50% concentration since the effluent from the tower can be only a few per cent more concentrated than the liquor in other sections of the tower. Agitation by the evolved hydrogen also causes attrition of the graphite packing with resultant loss of graphite catalyst and contamination of the caustic. Further, entrainment of concentrated caustic and amalgam by the escaping hydrogen causes plugging of the hydrogen lines with a mixture of solid caustic and mercury. This plugging of the hydrogen lines produces a high back pressure in the decomposing tower which forces hydrogen out through the liquor traps. Escaping hydrogen is, of course, a fire hazard and a menace to safety. Vertical flow processes of this type are also disadvantageous in that there is no control of the amalgam holding time, which fact makes complete removal of alkali metal from the amalgam difficult, especially after high concentrations of alkali have built up in the decomposing liquor.

A typical vertical flow amalgam decomposing device is disclosed in United States Patent 2,083,648 to Gorke, issued June 15, 1937. Another vertical flow process is shown in United States Patent 2,588,469 to Basilewsky, issued June 11, 1952. Basilewsky discloses a vertical amalgam decomposing tower divided into compartments. Horizontal partitions forming the compartments contain bubble caps and liquid seals to provide communication between the compartments. Each compartment also contains a number of trays or decomposing grids. Water and steam are introduced into the bottom of the tower and caustic and hydrogen are removed from the top. Amalgam introduced into the tower at the top flows downwardly in the tower countercurrent to the decomposing fluid from one compartment to the next through the liquid seals previously mentioned. The mercury produced is removed from the bottom of the tower. Lye formed in the tower is concentrated partly by vaporization of water which, although allowing the formation of concentrated caustic, requires an outside source of heat which is economically undesirable. Hydrogen formed in the tower also entrains mercury necessitating an additional recovery step. This is due to the fact that the tower is operated in a flooded condition so that provision for the removal of hydrogen is inadequate.

The process of the present invention comprises flowing a dilute amalgam down through an amalgam decomposing zone concurrently with an amalgam decomposing fluid while maintaining in the decomposing zone a plurality of horizontal amalgam-decomposing fluid interfaces, each of the interfaces being formed by a lower layer of amalgam and a supernatant layer of the decomposing fluid. The pairs of liquid layers, which are separated from each other by open spaces, are disposed one above the other in the decomposing zone. Each of the amalgam-decomposing fluid interfaces is in contact with catalyst means which may be composed of graphite or other suitable material. Open passage zones are mechanically maintained through each interface to allow flow of evolved hydrogen up through the decomposing zone without substantial agitation or mixture of the liquid layers. Spent amalgam, i. e., substantially pure mercury, and decomposing fluid containing combined alkali metal from the amalgam are removed separately from the lower portion of the decomposing zone.

My new process differs from most vertical flow processes of the prior art in that the decomposing zone is maintained in a non-flooded condition. This feature of my invention together with the provision for horizontal amalgam-decomposing fluid interfaces allows maximum contact of amalgam and decomposing fluid without substantial agitation or mixture of the two liquids. The lack of agitation in my process allows the production of more concentrated solutions of caustic than previously obtainable since the concentrated caustic produced is not mixed with incoming water or dilute caustic. Hydrogen produced in my process has easy access to the hydrogen outlet through the mechanically maintained open passages mentioned above, with the result that entrainment of caustic and amalgam by hydrogen is negligible.

The apparatus of the present invention comprises a tower containing a plurality of trays which are disposed horizontally to provide a number of compartments in the tower. The tower may have a cross section of any desired shape, e. g., circular, rectangular or square. A rectangular tower is often preferred since it permits a compact arrangement of apparatus in a cell room and simplifies the construction of inlets from mercury cells and outlets from the decomposing tower. Each tray carries one or more downcomer means and catalyst means. The catalyst can be composed of any suitable material, preferably graphite and may take any suitable form. I have found that graphite rods are particularly suitable. The rods can be of any suitable dimensions but should approximate the height of the downcomer means above the tray. The catalyst must be in contact with both the amalgam and decomposing fluid in order to have a catalytic effect. The effectiveness of the catalyst is directly proportional to the surface exposed to the amalgam-decomposing fluid interface. Therefore, when graphite rods are employed, it is preferred to use a large number of rods of small diameter rather than a smaller number of rods of large diameter. The catalyst can be attached to the tray in any suitable manner, e. g., by press-fitting into the body of the tray. The mode of attachment should provide good electrical contact with the body of the tower and should be rigid to avoid attrition of the graphite.

Each downcomer means comprises two concentric tubes or rings, upper and lower downcomer tubes, which can be composed of any suitable material, e. g., steel, graphite or glass, etc. The lower downcomer tube is attached to the body of the tray in any suitable manner as by press-fitting, and extends upwardly a distance suitable to maintain a layer of amalgam on the tray. The upper edge of the lower downcomer tube preferably may be serrated to facilitate the flow of excess amalgam over the top of the tube and down to the next tray. The upper downcomer tube is arranged concentrically around and above the lower inner downcomer tube to complete the structure of the downcomer means and the upper tube extends slightly below the upper edge of the lower tube so that the upper and lower tubes overlap. In the preferred embodiment of my apparatus in which the upper edge of the lower downcomer tube is serrated, the upper tube may be positioned to overlap the lower tube enough to just cover the indentations of the serrated edge. The downcomer tube means, like the tower, can be of any desired cross section, e. g., circular, square or rectangular.

Amalgams being much denser than decomposing fluids always form the lower layer of liquid on each tray in the apparatus. The depth of the amalgam layer is determined by the height of the lower downcomer tubes above the tray. Since the lower edges of the upper downcomer tubes overlap the upper ends of the lower downcomer tubes they also dip into the amalgam layer on the tray, forming a seal. Decomposing fluid, being lighter than amalgam, floats on the amalgam layer on the tray and is prevented from flowing over the top of the lower downcomer tubes by the amalgam seal. Thus a supernatant layer of decomposing fluid is retained by the upper downcomer tubes above the amalgam layer on each tray. Excess decomposing fluid overflows the upper downcomer tubes and flows down through the downcomer means to the next lower tray. The graphite rods embedded in the tray should extend upwardly from the tray to a point above the overlapping area of the upper and lower downcomer tubes so that they will be in contact with the interface between the layer of amalgam and supernatant layer of decomposing fluid, which interface will be approximately coincident with the lower end of the upper downcomer tubes.

The trays in the decomposing zone are spaced at suitable intervals, one above the other. The distance between the trays is a matter of choice but should be sufficient to provide an open space between the upper end of the upper downcomer tubes and the surface of the layer of decomposing fluid coincident therewith and the lower surface of the next higher tray in the tower.

In one modification of the above apparatus, the lower downcomer tubes may extend 1/8 to 1/4 of an inch above the level of the tray. Thus assembled, each tray may have an over-all thickness of as little as one inch so that a tower of such trays may be very compact, e. g., twenty or more trays may be fitted into a column having the same space requirements as a two foot packed tower. The apparatus of the present invention will be described further with reference to the attached drawing.

Figure 1 of the drawing shows a side elevation partly in section of one modification of the apparatus of my invention.

Figure 2 shows a top plan view along the line 2—2 of the embodiment of my invention shown in Figure 1.

Figure 3 shows a top plan view along the line 2—2 of a modification of the embodiment of the invention shown in Figure 1 having a plurality of downcomer means on each tray.

In Figure 1 the decomposition tower 1 is fitted at the top with a pipe 2 through which evolved hydrogen is removed and pipes 3 and 4 near the top of the tower through which decomposing fluid and amalgam are introduced, respectively. Trays 5 carry one or more graphite rods 6 and one or more lower downcomer tubes 7 which are serrated at the top. Each tube 7 is surrounded concentrically by an upper downcomer tube 8 arranged to overlap slightly the top of tube 7. A plurality of downcomer means and graphite rods on each tray are ordinarily used in practice. The downcomers are staggered to avoid a direct vertical line of gaseous communication. Excess amalgam flows under the lower edge of upper downcomer tube 8, overflows the upper edge of lower downcomer tube 7 and passes downward through the downcomer means to the next lower tray. A layer of decomposing fluid 10 is retained above the layer of amalgam on each tray 5 by the tubes 8, excess decomposing fluid overflows through downcomer tubes 8 and 7 to the next lower tray. Both amalgam and decomposing fluid are in contact with the graphite rods 6 on each tray. Trays 5 are spaced horizontally at suitable intervals one above the other in tower 1. Three trays are illustrated, although a larger number would ordinarily be used in practice. The tower 1 is fitted with an outlet 11 near the bottom for alkali metal-laden decomposing fluid, e. g., aqueous caustic, when the decomposition fluid is water, which overflows from layer 12 which collects in the lower portion of the tower. A pipe 13, suitably trapped, is provided in the lower portion of the tower 1 below the outlet 11 to remove mercury from the layer 14. Mercury, being heavier than caustic, collects in layer 14 below the supernatant layer of caustic 12 in the lower portion of the tower.

Figure 2 shows a top plan view through the line 2—2 of the apparatus illustrated by Figure 1. The concentric arrangement of upper and lower downcomer tubes 7 and 8 is shown. The connections 15 attached to the upper and lower downcomer tubes 7 and 8 serve to hold tube 8 in position. Three graphite rods 6 are illustrated, but in actual practice a larger number would usually be employed.

Figure 3 shows a top plan view through the line 2—2 of a modification of the apparatus illustrated by Figure 1 in which a plurality of downcomer means is employed.

In the method and apparatus of the present invention open passages of large diameter are provided for the escape of hydrogen in contrast to the tortuous passages of the packed towers of the prior art. Further, the holding time of the amalgam in the tower of my invention can be controlled, thus ensuring complete decomposition of the amalgam. Towers of the prior art, packed with graphite or other material, allowed amalgam to trickle downward by gravity through the packing material. Variation of the rate of feed to the tower did not, however, alter the time required for amalgam to seep downward through the packing. My tower, on the other hand, is provided with horizontal trays which retain layers of amalgam and decomposing fluid in contact for a prolonged length of time determined by the rate at which amalgam on each tray is displaced. Therefore, the holding time of amalgam can be adjusted by controlling the feed rate of amalgam to the tower.

In addition, the heat of reaction is efficiently utilized to evaporate decomposing fluid so that high concentrations of caustic, e. g., above 70% may be obtained in the effluent decomposing fluid. Each tray, at equilibrium, has its own particular concentrations in the two liquid phases, i. e., of alkali metal in the amalgam and caustic in the decomposing fluid and also its own particular temperature. For the above reasons, operation of the new apparatus is easily controlled and maintained in a steady state.

The invention will be further illustrated by a specific example of the operation of my new process carried out in the embodiment of the novel apparatus of my invention shown in Figure 1 of the drawing. Dilute sodium amalgam, containing about 0.15% sodium, obtained by electrolysis of brine in a mercury cathode electrolytic cell, is introduced into the decomposition tower 1 through pipe 4. Water is introduced into the tower through pipe 3. The two liquids flow onto trays 5, forming a layer of amalgam and a supernatant layer of water. Amalgam overflows the upper serrated edge of the lower downcomer tube 7 and passes to the next lower tray and in like manner to the succeeding trays. A layer of water is retained on each tray above the layer of amalgam by upper downcomer tube 8, excess water overflowing the tube 8 and passing downwardly through tube 7 from tray to tray as in the case of the amalgam. The water reacts with the amalgam to give almost pure mercury and aqueous caustic soda. The concentration of sodium in the amalgam decreases from tray to tray until the concentration is negligible at the bottom of the tower. Conversely, the concentration of aqueous caustic increases from tray to tray until it reaches a maximum of about 75% at the bottom of the tower. The temperature of the liquids on the trays increases toward the bottom of the tower; the temperature being sufficient in the lower portion of the tower to vaporize some of the water and thus increase the concentration of the aqueous caustic. The vaporized water rises through the downcomer tubes in each tray, as does the evolved hydrogen, thus helping to heat the upper portion of the tower. Spent amalgam, i. e., substantially pure mercury, is drawn off from the layer which forms in the bottom of the tower through pipe 13. Aqueous caustic, 75% NaOH by weight, is drawn off from the layer in the bottom of the tower through pipe 11. My process is also carried out as above when decomposing other amalgams, e. g., an amalgam containing about 0.15% potassium, with ethyl alcohol as a decomposing fluid. In this case, spent amalgam and an alcoholic solution of potassium ethylate are removed from the bottom of the tower.

I claim:

1. In a vertical flow process for decomposing dilute alkali metal amalgams with an amalgam-decomposing fluid in the presence of a graphite catalyst the improvement which comprises flowing dilute alkali metal amalgam and amalgam-decomposing fluid concurrently downwardly through an amalgam-decomposing zone, maintaining in said zone a plurality of horizontal amalgam-decomposing fluid interfaces each of said interfaces being formed by a layer of amalgam and a supernatant layer of decomposing fluid, said interfaces being separated from each other and disposed one above the other in said zone, maintaining graphite catalyst in contact with each interface, maintaining open passage zones in each interface in said decomposition zone to allow flow of amalgam and decomposing fluid downwardly in said zone and flow of hydrogen produced by the decomposition of amalgam upwardly in said zone, removing mercury from the lower portion of said zone, and drawing off decomposing fluid from the lower portion of said zone.

2. An apparatus for decomposing dilute alkali metal amalgams which comprises in combination a vertical decomposing tower, a plurality of contacting trays disposed horizontally in said tower and dividing the tower into a plurality of compartments, downcomer tube means comprising a lower downcomer tube embedded in each of said trays providing communication between the compartments defined by said trays and an upper downcomer tube positioned above and disposed concentrically around the lower downcomer tube, the lower edge of the upper downcomer tube extending below the level of upper edge of the lower downcomer tube, graphite catalyst means embedded in each of said trays and extending upwardly from the tray to a point above the overlapping area of the upper and lower downcomer tubes, inlet means in the upper portion of said tower above an upper tray for dilute amalgam, inlet means in the upper portion of said tower above an upper tray for amalgam-decomposing fluid, outlet means from the upper portion of said tower for removal of hydrogen, outlet means in the lower portion of said tower for removal of mercury, and outlet means above the mercury outlet means in the lower portion of said tower for the removal of amalgam-decomposing fluid.

3. An apparatus for decomposing dilute alkali metal amalgams which comprises in combination a vertical decomposing tower, a plurality of contacting trays disposed horizontally in said tower and dividing the tower into a plurality of compartments, a plurality of downcomer tube means on each tray, each of said downcomer tube means comprising a lower downcomer tube having serrated indentations on its upper end, embedded in the tray providing communication between the compartments defined by said tray, and an upper downcomer tube positioned above and disposed concentrically around the lower downcomer tube, the lower edge of the upper downcomer tube extending below the level of the indentations of the upper edge of the lower downcomer tube, a plurality of graphite catalyst means embedded in each of said trays and extending upwardly from the tray to a point above the overlapping area of the upper and lower downcomer tubes, inlet means in the upper portion of said tower, above an upper tray for dilute amalgam, inlet means in the upper portion of said tower above an upper tray for amalgam-decomposing fluid, outlet means from the upper portion of said tower for removal of hydrogen, outlet means in the lower portion of said tower for removal of mercury, and outlet means above the mercury outlet means in the lower portion of said tower for the removal of amalgam-decomposing fluid.

References Cited in the file of this patent

UNITED STATES PATENTS

| | | |
|---|---|---|
| 627,193 | Kelly | June 20, 1899 |
| 1,685,929 | Mount | Oct. 2, 1928 |
| 2,083,648 | Gorke | June 15, 1937 |
| 2,588,469 | Basilewsky | Mar. 11, 1952 |

FOREIGN PATENTS

| | | |
|---|---|---|
| 34,398 | Germany | Jan. 22, 1886 |